United States Patent
Ma et al.

(10) Patent No.: US 12,513,067 B2
(45) Date of Patent: Dec. 30, 2025

(54) METHOD, DEVICE AND COMPUTER-READABLE MEDIUM FOR MEASURING TRAFFIC HIT TIME DURING PATH SWITCH

(71) Applicant: Nokia Solutions and Networks Oy, Espoo (FI)

(72) Inventors: Xiao Hua Ma, Shanghai (CN); Ming Zhong, Shanghai (CN); Jin Jiang Chen, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 478 days.

(21) Appl. No.: 18/179,426

(22) Filed: Mar. 7, 2023

(65) Prior Publication Data

US 2023/0300050 A1 Sep. 21, 2023

(30) Foreign Application Priority Data

Mar. 16, 2022 (CN) .......................... 202210259608.0

(51) Int. Cl.
*H04L 43/0829* (2022.01)
*H04L 47/34* (2022.01)

(52) U.S. Cl.
CPC .......... *H04L 43/0829* (2013.01); *H04L 47/34* (2013.01)

(58) Field of Classification Search
CPC ... H04L 43/0829; H04L 47/34; H04L 43/062; H04L 41/0893; H04L 41/145; H04L 41/16; H04L 43/028; H04L 43/106; H04L 43/50
See application file for complete search history.

(56) References Cited

U.S. PATENT DOCUMENTS

| | | |
|---|---|---|
| 6,853,619 B1 | 2/2005 | Grenot |
| 9,191,290 B2 * | 11/2015 | Ding ..................... H04L 43/062 |
| 2005/0163053 A1 | 7/2005 | Paton et al. |
| 2010/0302967 A1 | 12/2010 | Lee et al. |
| 2017/0230265 A1 * | 8/2017 | Mishra .................. H04L 47/728 |
| 2019/0104058 A1 * | 4/2019 | Filsfils .................... H04L 45/34 |
| 2025/0227021 A1 * | 7/2025 | Platts ................. H04Q 11/0005 |

OTHER PUBLICATIONS

Partial European Search Report, dated Jul. 31, 2023, issued in corresponding European Patent Application No. 23160331.7.

(Continued)

*Primary Examiner* — Schquita D Goodwin
(74) *Attorney, Agent, or Firm* — Harness, Dickey & Pierce, P.L.C.

(57) ABSTRACT

Some embodiments of the present disclosure relate to methods, devices and computer-readable media for measuring traffic hit time during path switch. The method performed at a first device includes: sending, to a second device, operation administration and maintenance (OAM) frames with continuous sequence numbers; receiving from the second device response OAM frames; determining traffic hit start time and traffic hit stop time based on the received OAM frames; detecting an occurrence of the path switch, and determining that the path switch is completed before the traffic hit stop time; and in response to determining that the path switch is completed before the traffic hit stop time, calculating traffic hit time based at least on the traffic hit start time and the traffic hit stop time.

23 Claims, 12 Drawing Sheets

(56) References Cited

OTHER PUBLICATIONS

Siemens AG, "Method of Measuring the L2 Protection Switching Time for Packet Circuits from Transport Telecom Equipment", Prior Art Publishing GmbH, Berlin, Germany, Jul. 2018, pp. 1-3, XP007021789.
Dicko, H., "White Paper 038: Understanding Ethernet OAM", Feb. 2014, pp. 1-6 XP093065349.
ITU-T Telecommunication Standardization Sector of ITU, Recommendation ITU-T G.808.1, "Generic Protection Switching—Linear Trail and Subnetwork Protection," May 2014, pp. 1-74.
ITU-T Telecommunication Standardization Sector of ITU, Recommendation ITU-T G.8032/Y.1344, "Ethernet Ring Protection Switching," Mar. 2020, pp. 1-82.
ITU-T Telecommunication Standardization Sector of ITU, Recommendation ITU-T G.8031/Y.1342, "Ethernet Linear Protection Switching," Jan. 2015, pp. 1-96.
ITU-T Telecommunication Standardization Sector of ITU, Recommendation ITU-T G.8013/Y.1731, "Operation, Administration and Maintenance (OAM) Functions and Mechanisms for Ethernet-based Networks," Aug. 2015, pp. 1-102.
ITU-T Telecommunication Standardization Sector of ITU, SG15-C1399r1 Study Group 15, "Estimation of Protection Switching Time for MTN Path Layer Linear Protection," Geneva, Jul. 1-12, 2019, pp. 1-7.
ITU-T Telecommunication Standardization Sector of ITU, "Draft ITU-T Recommendation G.8032/Y.1344 (for consent)", Study Group 15 TD 498R1 (PLEN/15), Geneva, Feb. 11-22, 2008, pp. 1-40.
Office Action for European Application No. 23160331.7 dated Oct. 31, 2023.

\* cited by examiner

METHOD, DEVICE AND COMPUTER-READABLE MEDIUM FOR MEASURING TRAFFIC HIT TIME DURING PATH SWITCH

CROSS-REFERENCE TO RELATED APPLICATIONS

This application claims priority to and the benefit of Chinese Patent Application No. 202210259608.0 filed on Mar. 16, 2022, the entire contents of each of which are incorporated herein by reference.

FIELD

Embodiments of the present disclosure relate to the field of communications, and more particularly, to methods, devices and computer-readable media for automatically and in service, measuring, traffic hit time during path switch.

BACKGROUND

An optical or packet transmission system typically implements a protection mechanism to protect a networking entity, such as a port, an optical path data unit (ODUk) container (in the case of an optical transport network (OTN)), an Ethernet service/virtual local area network (VLAN) (in the case of an Ethernet) or a label switching path (LSP) or a pseudo wire (PW) (in the case of multi-protocol label switching (MPLS)). When a traffic hit time during Ethernet protection switching is measured, an offline method is usually used to measure by using a test instrument. The principle of testing is to connect a device under test (DUT) to the test instrument, the test instrument generates traffic frames having a constant size and a constant period, and then measures the number of frames lost during a switching operation. The traffic hit time may be obtained from the number of lost frames and the period of the frames. This method is offline and causes interference to the network service of the device under test (because it replaces a user traffic with the test instrument), and is typically only used in laboratory environments.

The problem of the above method lies in that, it is an active test (which generates interference) and requires to interrupt a service, however, there is a need for measuring a user traffic hit time during the protection switching in service, that is, a method that may be used when the service is in starting and running states. For example, a network element (NE) itself is required to execute measurements that are executed by a traditional external test instrument, calculate a switching time and report the same, such that a network service provider may verify the consistency of service level specifications (SLS).

SUMMARY

In general, the embodiments of the present disclosure relate to methods, devices and computer-readable media for automatically and in service, measuring, traffic hit time during path switch.

In a first aspect of the present disclosure, provided is a method for measuring traffic hit time during path switch. The method is performed at a first device, and includes: sending, to a second device, operation administration and maintenance (OAM) frames with continuous sequence numbers; receiving, from the second device, response OAM frames; determining traffic hit start time and traffic hit stop time based on the received OAM frames; detecting an occurrence of path switch, and determining that the path switch is completed before the traffic hit stop time; and in response to determining that the path switch is completed before the traffic hit stop time, calculating the traffic hit time based at least on the traffic hit start time and the traffic hit stop time.

In a second aspect of the present disclosure, provided is a method for measuring traffic hit time during path switch. The method is performed at a first device, and includes: receiving, from a second device, operation administration and maintenance (OAM) frames with continuous sequence numbers; determining traffic hit start time and traffic hit stop time based on the received OAM frames; detecting an occurrence of path switch, and determining that the path switch is completed before the traffic hit stop time; and in response to determining that the path switch is completed before the traffic hit stop time, calculating the traffic hit time based at least on the traffic hit start time and the traffic hit stop time.

In a third aspect of the present disclosure, provided is a first device for measuring traffic hit time during path switch, including: at least one processor; and at least one memory, including a computer program code, wherein the at least one memory and the computer program code are configured to, with the at least one processor, cause the first device to: send, to a second device, operation administration and maintenance (OAM) frames with continuous sequence numbers; receive, from the second device, response OAM frames; determine traffic hit start time and traffic hit stop time based on the received OAM frames; detect an occurrence of path switch, and determine that the path switch is completed before the traffic hit stop time; and in response to determining that the path switch is completed before the traffic hit stop time, calculate the traffic hit time based at least on the traffic hit start time and the traffic hit stop time.

In a fourth aspect of the present disclosure, provided is a first device for measuring a traffic hit time during path switch, including: at least one processor; and at least one memory, including a computer program code, wherein the at least one memory and the computer program code are configured to, with the at least one processor, cause the first device to: receive, from a second device, operation administration and maintenance (OAM) frames with continuous sequence numbers; determine traffic hit start time and traffic hit stop time based on the received OAM frames; detect an occurrence of path switch, and determine that the path switch is completed before the traffic hit stop time; and in response to determining that the path switch is completed before the traffic hit stop time, calculate the traffic hit time based at least on the traffic hit start time and the traffic hit stop time.

In a fifth aspect of the present disclosure, provided is a method for measuring a path switch time. The method is executed at a first node, and includes: receiving, from at least a second node, an indication of a state machine for path switch; filtering the indication by using a sliding window of a duration P, wherein P is configurable; determining start time and completion time of the path switch based on a filtering result of the indication; and calculating the path switch time based on the start time and the completion time of the path switch.

In a sixth aspect of the present disclosure, provided is a first node for measuring a path switch time, including: at least one processor; and at least one memory, including computer program code, wherein the at least one memory and the computer program code are configured to, with the at least one processor, cause the first node to: receive, from at least a second node, an indication of a state machine for path switch; filter the indication by using a sliding window of a duration P, wherein P is configurable; determine start time and completion time of the path switch based on a filtering result of the indication; and calculate the path switch time based on the start time and the completion time of the path switch.

In a seventh aspect of the present disclosure, provided is a computer-readable storage medium, having a program code is stored thereon, and the program code is configured to, when executed, cause an apparatus to execute the method according to any one of the first aspect, the second aspect, or the fifth aspect.

It should be understood that, the content described in the summary of the invention is not intended to define critical or important features of the embodiments of the present disclosure, nor is it intended to limit the scope of the present disclosure. Other features of the present disclosure will become readily understood from the following description.

BRIEF DESCRIPTION OF THE DRAWINGS

The above and other features, advantages and aspects of various embodiments of the present disclosure will become more apparent in combination with the drawings and with reference to the following detailed description. In the drawings, the same or similar reference signs represent the same or similar elements, wherein.

DETAILED DESCRIPTION OF EMBODIMENTS

Figure 1:
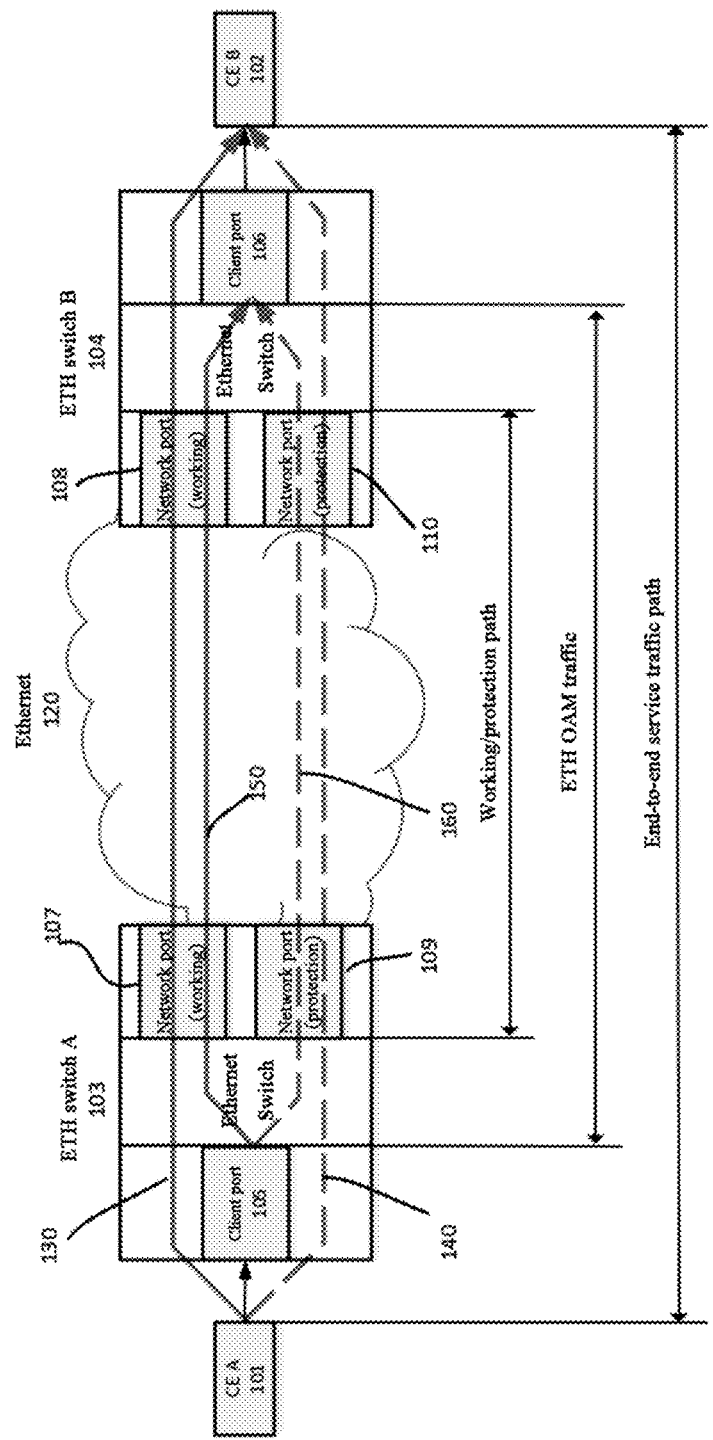
FIG. 1 illustrates a schematic diagram of path switch of a service traffic and an OAM traffic during protection switching according to an embodiment of the present disclosure.

The principles and spirit of the present disclosure will be described below with reference to several exemplary embodiments shown in the drawings. It should be understood that, these specific embodiments are described only to enable those skilled in the art to better understand and implement the present disclosure, and not to limit the scope of the present disclosure in any way.

As used herein, the term "including" and similar terms thereof should be understood as open-ended inclusions, that is, "including but not limited to". The term "based on" should be understood to be "based at least partially on". The term "one embodiment" or "an embodiment" should be understood as "at least one embodiment". The terms "first", "second" and the like may refer to different or the same objects. Other explicit and implicit definitions may also be included below.

As used herein, the term "determining" encompasses a wide variety of actions. For example, "determining" may include operating, computing, processing, deriving, investigating, searching (for example, looking up in a table, a database, or another data structure), ascertaining, and the like. Further, "determining" may include receiving (for example, receiving information), accessing (for example, accessing data in a memory), etc. In addition, "determining" may include parsing, choosing, selecting, establishing, etc.

The term "circuit" as used herein refers to one or more of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As described above, when traffic hit time during Ethernet protection switching is measured, an offline method is usually used to measure by using a test instrument. It is considered that Ethernet ETH switches A and B provide an end-to-end operator Ethernet service defined by an MEF, so as to carry a user data traffic, which is referred to as "service frames", and the redundancy between a client equipment (CE) A and a CE B is provided by using an Ethernet protection mechanism (e.g., ITU-T G8032 Ethernet Ring Protection (ERP) or ITU-T G.8031 Ethernet Linear Protection (ELP), and the like) on a network side, so that the user data traffic may be switched from a working path to a protection path, and vice versa. During the switching, the traffic may be lost from the time one path detects a failure to the time the other path starts to transfer the traffic, this is called the traffic hit time.

The International Telecommunication Union ITU-T G.808.1 defines different time periods from network damage to complete recovery of a protected traffic. The ITU-T G.8031 ELP and ITU-T G.8032 ERP require that the time experienced from the starting of a protection switching operation to the completion of the protection switching operation should be less than 50 ms. However, a service provider is most concerned with the recovery time of the protected traffic, that is, traffic hit time experienced by the user data traffic. Conventional methods require disabling the network service, using an external test instrument to generate a traffic of frames having a constant size and a constant period, then measuring the number of frames lost during the switching operation, and obtaining the traffic hit time by means of the number of lost frames and the period of the frames. However, the conventional methods cause interference to the network service of a device under test, and may often be only used in laboratory environments.

Given this, the embodiments of the present disclosure propose a method of automatically and in service measuring traffic hit time during path switch, and the method may execute measurement when the service is in the starting and running state. The basic principle is to enable an ETH OAM tool on a maintenance endpoint (MEP) of a user network interface (UNI) of the CE, so as to monitor user data traffics in one direction or two directions, and the ETH OAM tool may send OAM frames, which have a constant period (or have a constant period and a constant size at the same time) and form a sequence. In the case of protection switching (i.e., switching from a working path to a protection path or switching from the protection path to the working path), traffic hit start time and traffic hit stop time are obtained according to sequence numbers and/or timestamp information in the received ETH OAM frames, so as to calculate traffic hit time.

FIG. 1 is a schematic diagram 100 of path switch of a service traffic and an OAM traffic between a CE A and a CE B during protection switching according to an embodiment of the present disclosure. As shown in FIG. 1, between a between a CE A 101 and a CE B 102, there is an end-to-end service traffic working path 130, which passes by a client port 105, a network port 107 and an Ethernet 120 of an ETH switch A 103, and a network port 108 and a client port 106 of an ETH switch B 104, and there is an end-to-end service traffic protection path 140, which passes by the client port 105, a network port 109 and the Ethernet 120 of the ETH switch A 103, and a network port 110 and the client port 106 of the ETH switch B 104. After the ETH OAM tool is enabled on the MEP of the UNI of the CE, between the client ports 105 and 106, there is also an ETH OAM traffic working path 150, which passes by the network port 107 and the Ethernet 120 of the ETH switch A 103, and the network port 108 and the client port 106 of the ETH switch B, and there is also an ETH OAM traffic protection path 160, which passes by the network port 109 and the Ethernet 120 of the ETH switch A 103, and the network port 110 of the ETH switch B.

Since both the user service traffic path from the CE A 101 to the CE B 102 and the OAM traffic path from an OAM sending end to an OAM receiving end cover the switching path between the network port of the ETH switch A and the network port of the ETH switch B, the traffic hit time experienced by the user service traffic is almost equal to the traffic hit time experienced by the OAM traffic. Since the user service traffic has abruptness and a variable frame size, if there is a long user frame at a switching time boundary, compared with the traffic hit time experienced by the OAM traffic, the traffic hit time experienced by the user service traffic may be longer, the maximum time increment=2× MTU time (i.e., the maximum transmission unit time, which refers to the time to transmit the Ethernet frame with the size of maximum transmission unit on the line).

Figure 2:
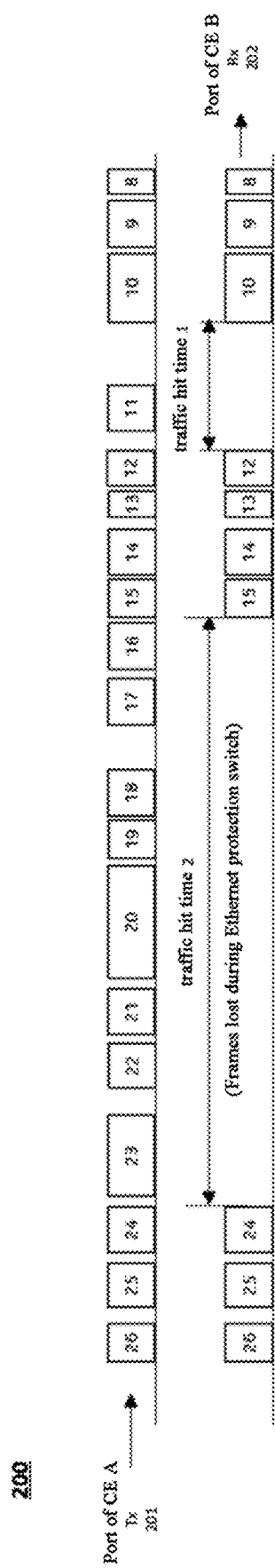
FIG. 2 illustrates an example diagram of sending and receiving a user service traffic according to an embodiment of the present disclosure.

FIG. 2 illustrates an example diagram 200 of sending and receiving a user service traffic according to an embodiment of the present disclosure. A port 201 of CE A sends, to a port 202 of CE B, a data frame having a variable size and a variable period. However, since the data frame may experience protection switching or loss due to other reasons during the transmission process, there may be one or more traffic hit times in the data frame received by the port 202 of CE B, for example, a user traffic hit time 1 as shown in FIG. 2 and a user traffic hit time 2 for protection switching.

Figure 3:
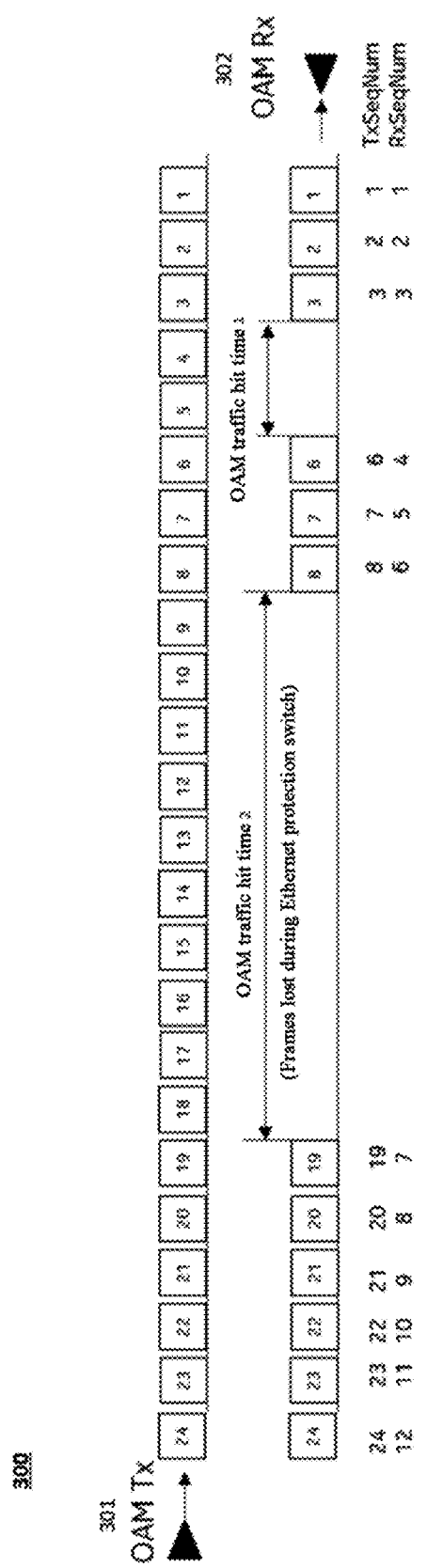
FIG. 3 illustrates an example diagram of sending and receiving an OAM traffic according to an embodiment of the present disclosure.

FIG. 3 illustrates an example diagram 300 of sending and receiving an OAM traffic embedded in the user service traffic shown in FIG. 2 according to an embodiment of the present disclosure. The OAM frame sent by an OAM sending end (OAM Tx) 301 to an OAM receiving end (OAM Rx) 302 has a constant period. In the OAM frame received by the OAM Rx 302, there are an OAM traffic hit time 1 corresponding to the user traffic hit time 1 shown in FIG. 2 and an OAM traffic hit time 2 for protection switching and corresponding to the user traffic hit time 2 shown in FIG. 2. It should be noted that, in some embodiments, the OAM frame sent by the OAM Tx 301 to the OAM Rx 302 may have a constant period and a constant size, which is not limited in the present disclosure in this regard.

A method for measuring the traffic hit time between the CE A and the CE B during protection switching by using an OAM traffic according to some embodiments of the present disclosure will be specifically described below in combination with FIG. 1 to FIG. 3.

To measure the traffic hit time from the CE A to the CE B, the following preconditions may be executed:
  enable the service to carry the user data traffic; and
  enable an Ethernet protection mechanism to provide a redundant path for the service, wherein the Ethernet protection mechanism includes, but is not limited to, ERP, ELP, a spanning tree protocol, and other suitable Ethernet protection mechanisms capable of providing path protection.

According to some embodiments of the present disclosure, the traffic hit time from the CE A to the CE B during protection switching may be measured by executing the following functions.

1. Enable the ETH OAM TX 301 on the ETH switch A 103, and enable the ETH OAM Rx 302 on the ETH switch B 104, so as to monitor the network service, wherein the sent OAM frame has:
  1) a constant period;
  2) a sequence number (starting from 1, an increment 1 for each next OAM frame in sequence);
  3) (optional) a constant size; and
  4) (optional) a timestamp (a time at which the OAM is sent out of a node).

2. Detect the start and the stop of the traffic hit time, via continuously monitoring the sequence numbers in the received OAM frames and counting the number of the received OAM frames.

The start time of the traffic hit time is based on one of the following methods:
1) an M filter method: started from the first frame out of M consecutive OAM frames when there is a configurable number (M) of consecutive OAM frames are lost (M is an integer, and M>=1); or
2) an X/Y filter method: since chatter may occur in an actual fault, in order to cover the time from the fault being unable to the fault being stable, a sliding window filter may be used, wherein X=the total number of OAM frames sent within the window, Y=the total number of OAM frames lost within the window, and X and Y are both configurable positive integers. If there are Y lost OAM frames among the X sent OAM frames, then the first frame among the Y lost OAM frames corresponds to the start time of the traffic hit time.

The stop time of the traffic hit time may be based on the following method:
1) an N filter method: when a configurable number N of continuous OAM frames are successfully received (N is an integer and N≥1), the first frame among the N continuous OAM frames corresponds to the stop time of the traffic hit time.

It should be noted that, an M filter, an X/Y filter and an N filter can be carefully designed, in order to be able to capture real faults/recoveries and filter false faults/recoveries.

According to some embodiments of the present disclosure, a method for implementing the filter based on the sequence numbers of the OAM frames at least includes:
only calculating the number of lost OAM frames after the OAM frames are received, that is, after the traffic is partially recovered;
then, referring to FIG. 3, based on TxSeqNum and RxSeqNum, determining whether the loss of the OAM frames is continuous or discontinuous, wherein TxSeqNum represents the sequence number (carried in the OAM frame) of the OAM frame sent by the OAM Tx 301, and RxSeqNum represents the sequence number (counted by the OAM Rx) of the OAM frame received by the OAM Rx 302. For each received OAM frame (numbered i), the OAM Rx 302 will obtain TxSeqNum (i) and RxSeqNum (i). Therefore, if RxSeqNum (i+1)−RxSeqNum (i)=1, but TxSeqNum (i+1)−TxSeqNum (i)>1, it means that TxSeqNum (i+1)−txSeqNum (i)−1 continuous OAM frames are lost; if there are k pairs of TxSeqNum and RxSeqNum, wherein rxSeqNum (i+1)−rxSeqNum (i)=1, and TxSeqNum (i+1)−TxSeqNum (i)=1, it means that k continuous correct OAM frames are successfully received.

3. Detect the occurrence of Ethernet protection switching. In some embodiments of the present disclosure, the occurrence of the Ethernet protection switching may be detected by means of a state change of an Ethernet protection group.
1) If the traffic hit time in step 2 does not stop before the Ethernet protection switching, no operation is not executed.
2) If the traffic hit time in step 2 stops, step 4 is performed.

4. Wait for the stop of the traffic hit time in step 2, and save the sequence number and/or timestamp of the first OAM frame corresponding to the start time and the stop time of the traffic hit time.

5. According to some embodiments of the present disclosure, the traffic hit time in a direction from the CE A to the CE B may be calculated based at least on one of the following methods:

1) The traffic hit time=the number of lost OAM frames × the period of the OAM frames=(SequenceNumber_stop−SequenceNumber_start)×the period of the OAM frames, wherein SequenceNumber_stop represents the sequence number of the OAM frame corresponding to the stop time of the traffic hit time, and SequenceNumber_start represents the sequence number of the OAM frame corresponding to the start time of the traffic hit time;
2) the traffic hit time=the number of lost OAM frames × the period of the OAM frames+2×MTU time=(SequenceNumber_stop−SequenceNumber_start)×the period of the OAM frames+2×MTU time;
3) the traffic hit time=Timestamp_stop−Timestamp_start, wherein Timestamp_stop represents the timestamp of the OAM frame corresponding to the stop time of the traffic hit time, and Timestamp_start represents the timestamp of the OAM frame corresponding to the start time of the traffic hit time; or
4) the traffic hit time=Timestamp_stop−Timestamp_start+2×MTU time.

It should be noted that, although the above operations of the method according to some embodiments of the present disclosure are described in the above specific order, this does not require or imply that these operations must be performed in the specific order, or that all of the illustrated operations must be executed to achieve desired results. Rather, the execution order of the steps depicted may be changed. Additionally or alternatively, certain steps may be omitted, a plurality of steps may be combined into one step for execution, and/or one step may be decomposed into a plurality of steps for execution. For example, in an embodiment of traffic hit caused by non-Ethernet protection switching, the step 3 may be omitted.

Figure 4:
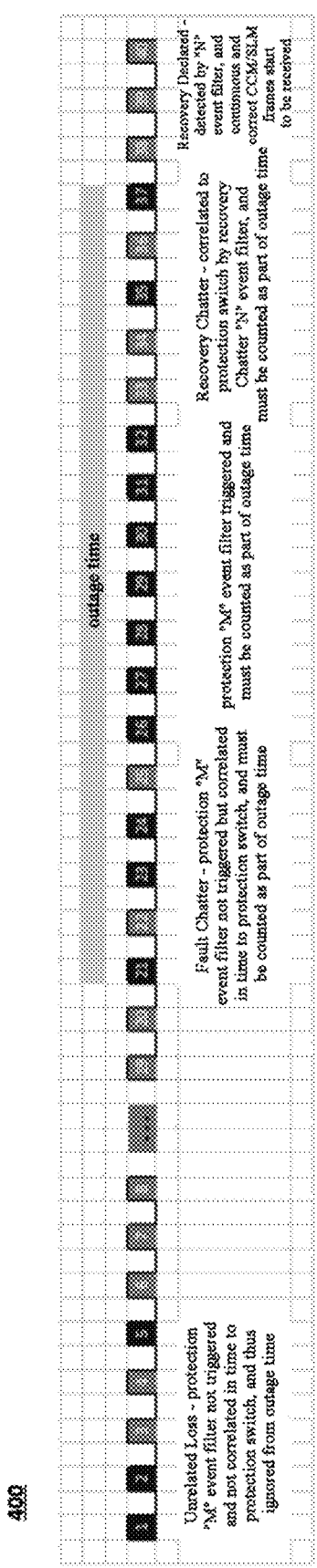
FIG. 4 illustrates an example diagram of detecting a traffic hit start time and a traffic hit stop time of protection switching by using an OAM frame according to an embodiment of the present disclosure.

FIG. 4 illustrates an example diagram 400 of detecting traffic hit start time and traffic hit stop time of protection switching by using an OAM frame according to an embodiment of the present disclosure, wherein a dark color block represents a lost OAM frame, and a light color block represents an OAM frame that is successfully received by the OAM Rx.

According to the example of FIG. 4, for the M filter method and the N filter method in the step 2, if M=N=3, the start time of the traffic hit time corresponds to the frame 26, and the stop time of the traffic hit time corresponds to the frame 38. For the X/U filter method and the N filter method in the step 2, if X=4, Y=3 and N=3, the start time of the traffic hit time corresponds to the frame 21, and the stop time of the traffic hit time corresponds to the frame 38.

The method according to the embodiment of the present disclosure may be implemented using various OAM tools, including, but not limited to, single-ended SLM, such as single-ended SLM defined by the ITU-T Y.1731/G.8013 specification; double-ended SLM, such as double-ended SLM defined by the ITU-T Y.1731/G.8013 specification; single-ended SLM of additional type-length-value (TLV) carrying a timestamp; double-ended SLM of additional TLV carrying a timestamp; single-ended delay measurement (DM) of additional TLV carrying a sequence number; double-ended DM of additional TLV carrying a sequence number; and a newly proposed OAM tool having a sequence number and a timestamp.

In these OAM tools, the first two OAM tools may be used for the sequence number-based traffic hit time calculation method in step 5, while the remaining OAM tools may be used for the timestamp-based traffic hit time calculation method in step 5.

The method according to the embodiment of the present disclosure being implemented using some OAM tools in the OAM tools will be described below by way of example. It should be noted that, the method according to the embodiment of the present disclosure is not limited to the OAM tools described above or described below, but any OAM tool having a sequence number and/or a timestamp may be used for implementing the method according to the embodiment of the present disclosure, and is within the protection scope of the present disclosure.

Figure 5:
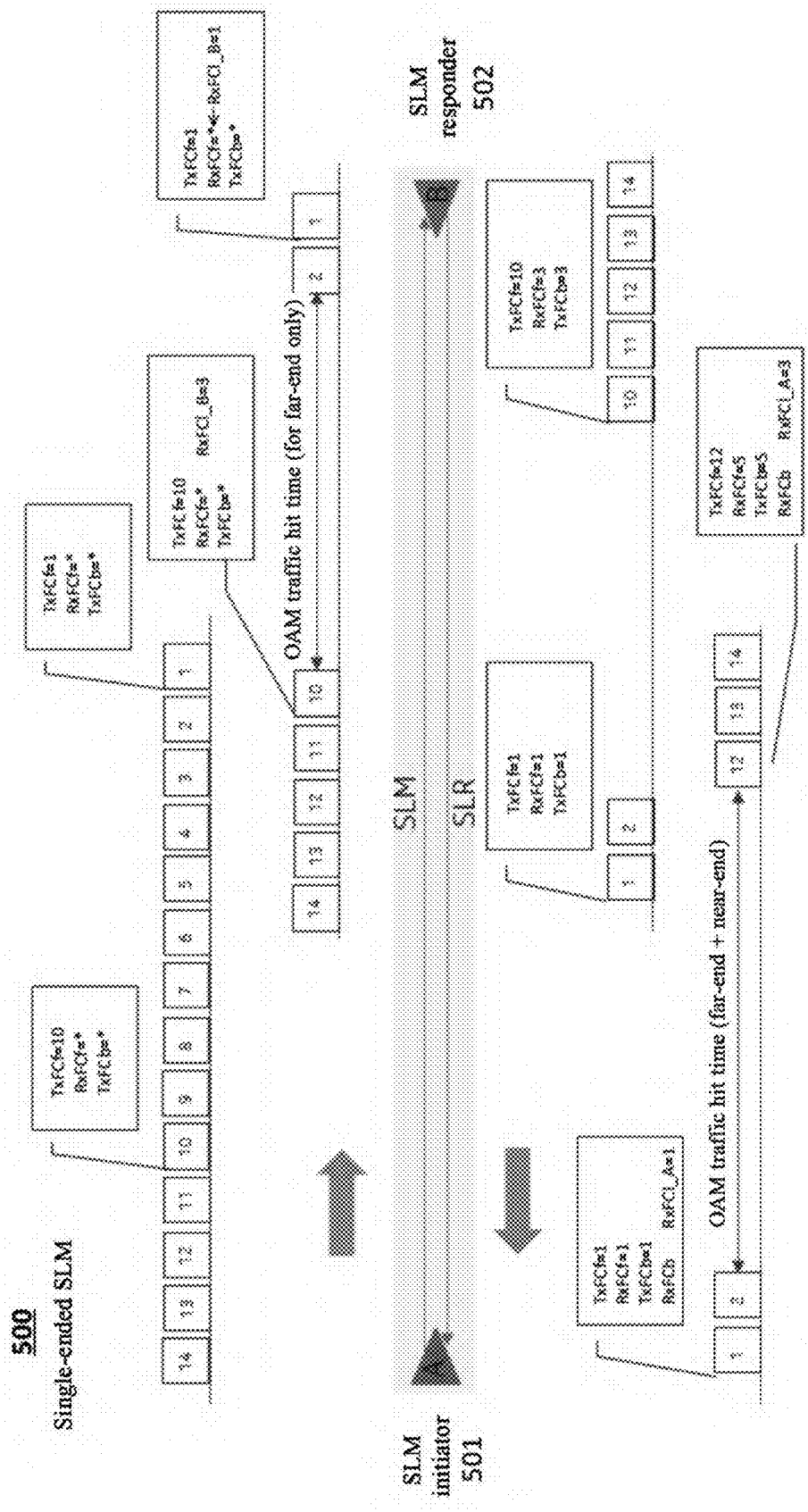
FIG. 5 illustrates an example diagram of measuring a traffic hit time of protection switching by using single-ended synthetic loss measurement (SLM) according to an embodiment of the present disclosure.

FIG. 5 illustrates an example diagram 500 of measuring traffic hit time of protection switching by using an OAM tool based on single-ended SLM according to an embodiment of the present disclosure. In the single-ended SLM, an SLM initiator 501 sends an SLM frame (i.e., an OAM frame) to an SLM responder 502, the SLM responder 502 responds to each received SLM frame with a synthetic loss response (SLR) frame (i.e., an OAM frame), and the calculation of SLM frame loss may be only performed at the SLM initiator 501. An SLM SLR protocol frame carries 3 counters: TxFCf, RxFCf and TxFCb, and the SLM initiator/responder is in a local snapshot RxFCl.

Wherein, TxFCf denotes the total number of transmitted SLM frames in the far-end direction at the time this SLM frame is sent; RxFCf denotes the total number of received SLM frames in the far-end direction at the time this SLM frame is received; TxFCb denotes the total number of transmitted SLR frames in the near-end direction at the time this SLR frame is sent; and RxFCl denotes the total number of the received SLR frames in the near-end direction at the time this SLR frame is received.

The SLM initiator may calculate far-end frame loss and near-end frame loss based on the counter carried in the received SLR, for example, by means of the following manner:

Far-end frame loss=|TxFCf[n]−TxFCf[n−1]|−|RxFCf[n]−RxFCf[n−1]|, and

Near-end frame loss=|TxFCb[n]−TxFCb[n−1]|−|RxFCl[n]−RxFCl[n−1]|.

However, in some cases, there may be limitations in the single-ended SLM. For example, 1) As SLM responder generates SLRs only when SLMs are received, in the near-end direction from B to A SLR frames may not be generated at constant periods due to the loss of SLM frames. So, during the time SLRs are not generated, frame loss in near-end direction are not catched, so the traffic hit time may be always zero, or far less than the real hit time. 2) SLM initiator calculates the frame loss only when SLRs are received, but if SLRs are lost in the near-end direction, the far-end counters (TxFCf and RxFCf) cannot be received continuously, which may impact the judgement of the start/end of the far-end direction traffic hit time.

Thus, one solution may be to use such single-ended SLM to calculate bidirectional traffic hit time (i.e., a time from traffic hit to bidirectional traffic recovery in any direction). At this time, TxFCf may be regarded as TxSeqNum, and RxFCl may be regarded as RxSeqNum.

Another solution may be to calculate a unidirectional hit time, that is, respectively calculate the traffic hit time from the CE A to the CE B and the traffic hit time from the CE B to the CE A, TxFCf may be regarded as TxSeqNum, and RxFCf may be regarded as RxSeqNum. This needs to additionally enable a pair of SLM initiator and SLM responder, that is, enable the SLM initiator on the CE B and enable the SLM responder on the CE A. Then, the functions on the CE B are run in the manner described in the step 1 to the step 5.

Figure 6:
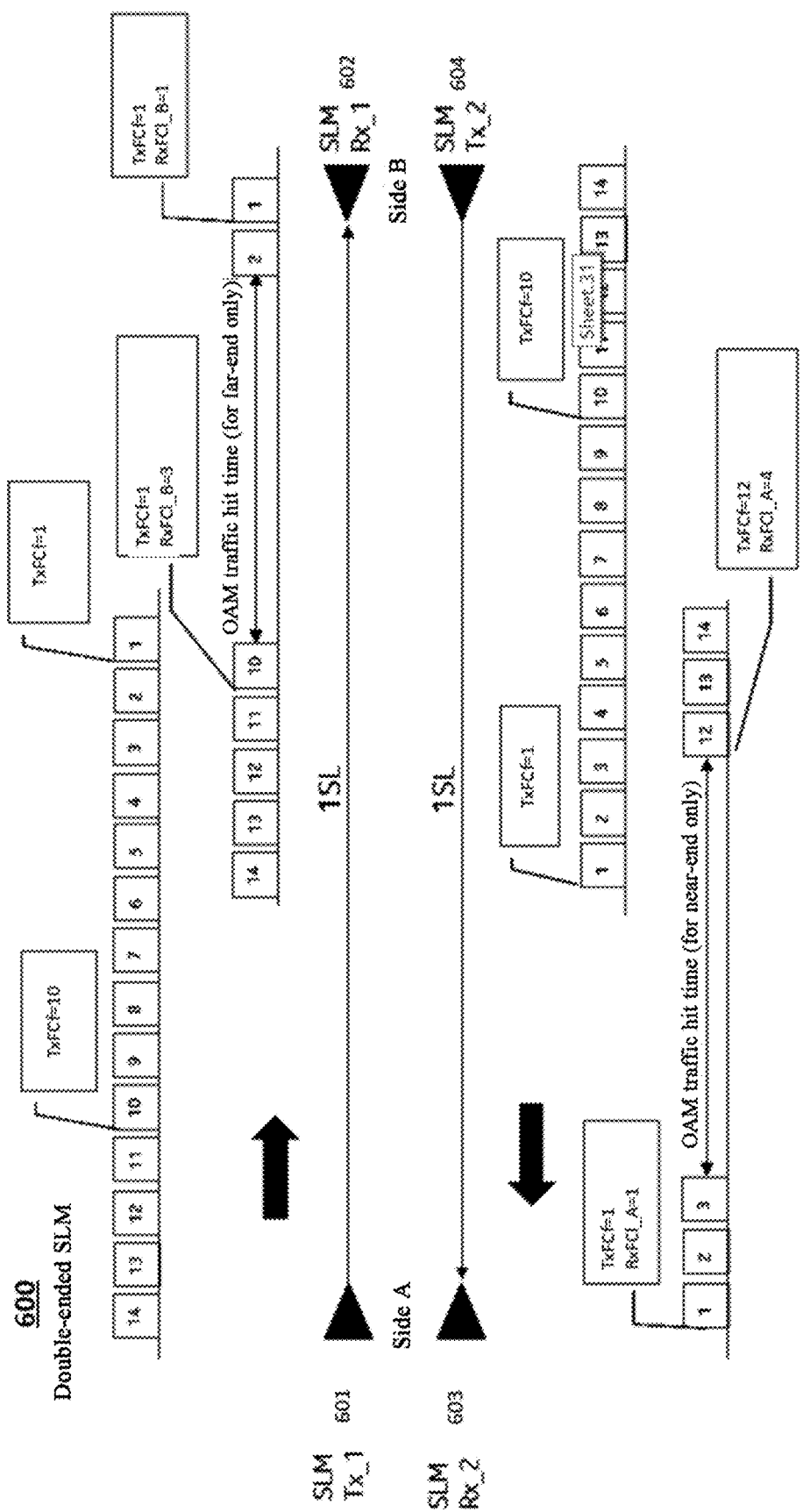
FIG. 6 illustrates an example diagram of measuring a traffic hit time of protection switching by using double-ended SLM according to an embodiment of the present disclosure.

FIG. 6 illustrates an example diagram 600 of measuring traffic hit time of protection switching by using an OAM tool based on double-ended SLM according to an embodiment of the present disclosure.

In the double-ended SLM, an SLM transmitter (i.e., SLM Tx_1 601 or SLM Tx_2 603) sends a 1SL frame (i.e., an OAM frame) to an SLM receiver (i.e., SLM Rx_1 602 or SLM Rx_2 604). When receiving the 1SL frame, the SLM receiver calculates traffic hit time in the far-end direction (i.e., the direction from A to B) based on the received 1SL frame. The 1SL frame carries one counter, e.g., TxFCf, this counter counts from 1 for each 1SL frame, and the SLM receiver is in the local snapshot RxFCl.

Wherein, TxFCf denotes the total number of transmitted 1SL frames in the far-end direction at the time this 1SL frame is sent; and RxFCl denotes the total number of the received 1SL frames in the near-end direction at the time this 1SL frame is received.

The SLM receiver calculates near-end frame loss based on the counter carried in the received 1SL. That is, the SLM Rx_1 602 may calculate the frame loss in the direction from A to B, and the SLM Rx_2 604 may calculate the frame loss in the direction from B to A.

Near-end frame loss=|Txfcf[n]−Txfcf[n−1]|−|RxFCf[n]−RxFCf[n−1]|.

In order to calculate the unidirectional traffic hit time, TxFCf may be regarded as TxSeqNum, and RxFCf may be regarded as RxSeqNum.

Figure 7:
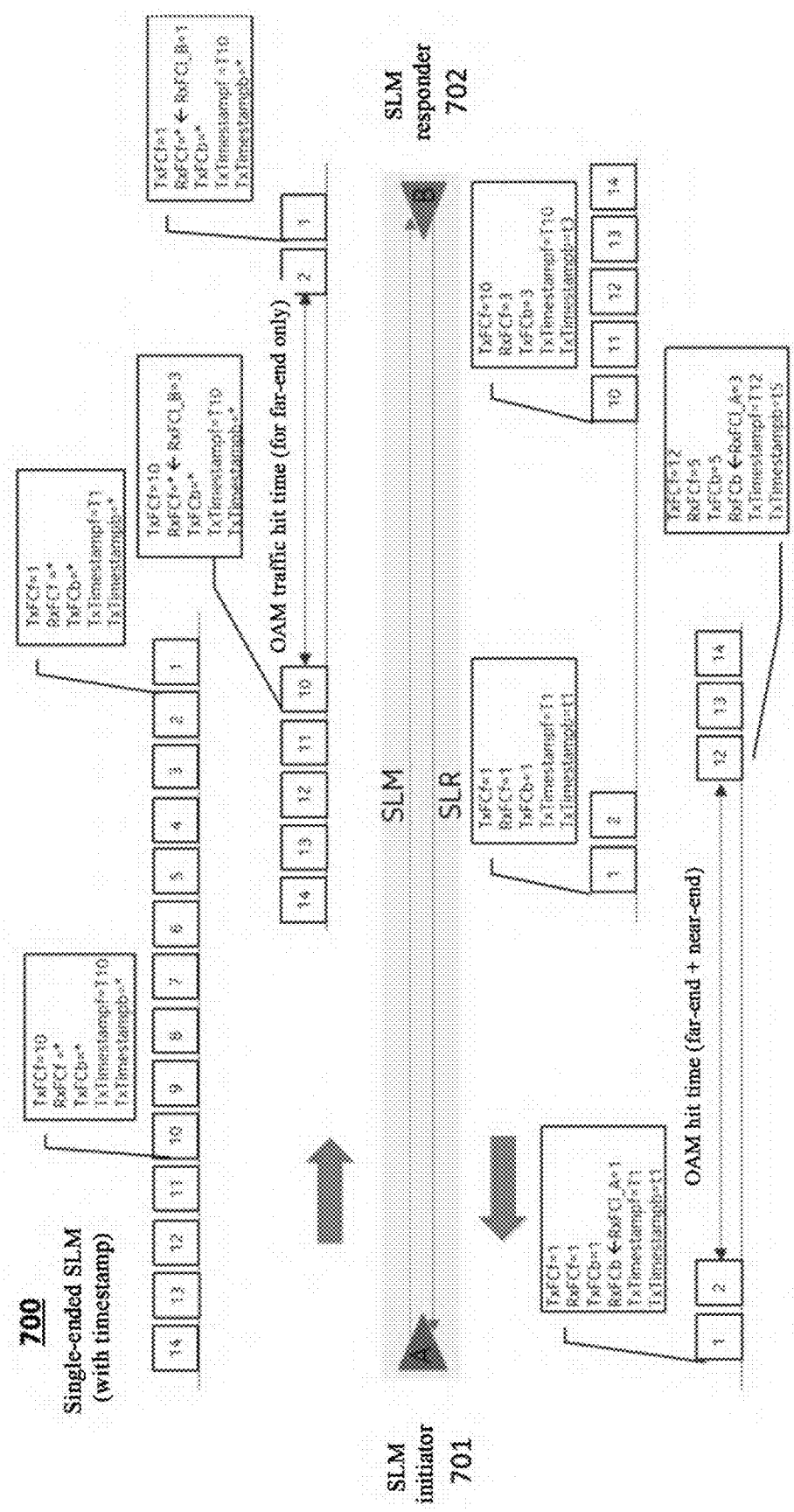
FIG. 7 illustrates another example diagram of measuring a traffic hit time of protection switching by using single-ended SLM according to an embodiment of the present disclosure, wherein an OAM frame has a timestamp field.

FIG. 7 illustrates another example diagram of measuring traffic hit time of protection switching by using an OAM tool based on single-ended SLM according to an embodiment of the present disclosure. The OAM frame has a timestamp field. An SLM initiator 701 sends SLM frames to an SLM responder 702, the SLM responder 702 utilizes the SLR frames for each received SLM frame, and the calculation of SLM frame loss may be only performed at the SLM initiator 701.

In the single-ended SLM with timestamps, the start time and the stop time of the traffic hit time can be still determined based on the sequence number, but the traffic hit time may be calculated based on the timestamp method in the step 5.

The method for measuring the traffic hit time according to the embodiments of the present disclosure is described above by way of example by using the OAM tools based on single-ended SLM, double-ended SLM and single-ended SLM with timestamps. However, the present disclosure is not limited thereto, any other mechanisms may send service frames/packets having constant periods/sizes, sequence numbers, and/or timestamps, and these mechanisms are all within the scope of the present disclosure.

When these OAM tools are used, the shorter the period of the OAM frames is, the higher the accuracy is. The transmission time of Ethernet protection switching is usually about 50 ms, therefore, if the period of the used OAM frames is about hundreds of microseconds, the measured traffic hit time can reach the precision of 1 millisecond, or if the period of the used OAM frames is 3.33 ms or 10 ms, the precision is about tens or hundreds of milliseconds.

In addition, the detection of the start time/stop time of the traffic hit time may also relate to big data and artificial intelligence/machine learning technology. For example, the state (e.g., receiving or discarding) of each OAM frame in the OAM traffic is stored in a memory as historical data like big data, and then an artificial intelligence/machine learning model may perform further training and analysis based on these historical data, so as to predict or judge a fault occurrence time capable of triggering protection, and to help recommend values of M, N, X and Y to simplify user configurations.

According to some embodiments, the present disclosure further provides a method for automatically and in service measuring a path switch time by means of snooping a state machine of Ethernet protection switching. The method may include: monitoring the input, output and state of the state machine of the Ethernet protection mechanism (e.g., Ethernet linear protection in the ITU-T G.8031 specification, and Ethernet ring network protection in the ITU-T G.8032 specification and/or spanning tree protocol mechanism, and the like), so as to serve as an indication of the occurrence of a protection switching action, recording the time at which the indication changes each time, and then using a sliding window of P milliseconds (P is an integer and default value can be 100 ms) to filter the changes of the indication. The path switch time may be: the stop time of the change—the start time of the change.

According to some embodiments of the present disclosure, the indication of the occurrence of the protection switching action includes at least one of the following: a change of the protection state; a condition for triggering the changes of the protection state (e.g., a local failure, a local external annotation, a received protocol message or a timer, and the like); a condition for triggering a filtering database (FDB) flushing action (e.g., a local failure, a local external switching command, a received protocol packet or a timer, and the like); start/completion of network bridge setup (in the Ethernet linear protection); start/completion of selector setup (in the Ethernet linear protection); start/completion of the FDB flushing action (in the Ethernet ring network protection); and blocking/unblocking of a ring network port (in the Ethernet ring network protection).

The above indication is described by way of example only, the method according to the embodiment of the present disclosure is not limited to the above indication, other indications such as input, output or state of a protection switching algorithm may also be used, and these indications are all within the scope of the present disclosure.

According to some embodiments of the present disclosure, the Ethernet linear protection algorithm may include an Ethernet linear protection algorithm in the ITU-T G.8031/Y.1342 specification, and the Ethernet ring network protection algorithm may include an Ethernet ring network protection algorithm in the ITU-T G.8032/Y.1344 specification, but the present disclosure is not limited thereto, the method of the present disclosure may be implemented based on any Ethernet protection algorithms, and these algorithms are all within the scope of the present disclosure.

According to some embodiments of the present disclosure, the start time/completion time of the path switch may be detected in the following method: if one indication among the indications occurs, and no indication occurs within a duration P before the one indication occurs, determining the timestamp of the frame corresponding to the indication to be start time of the path switch; and if the indication of the state machine does not occur within the duration P after the last indication, determining the timestamp of the frame corresponding to the last indication to be the completion time of the path switch.

Figure 8:
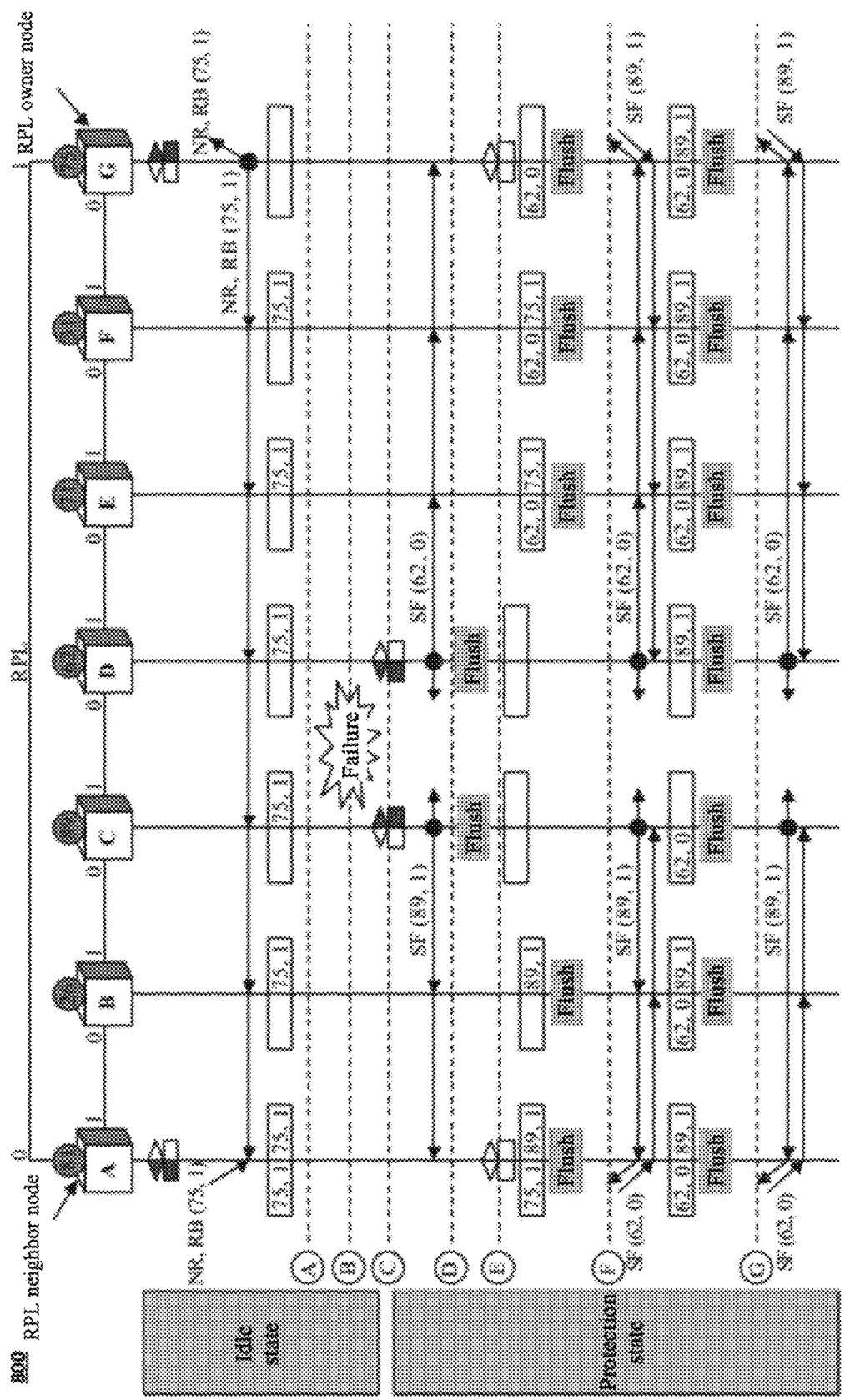
FIG. 8 illustrates an example diagram of measuring a path switch time according to an embodiment of the present disclosure.

FIG. 8 illustrates an example diagram 800 of measuring a path switch time according to an embodiment of the present disclosure. In the example, the following indications appear in sequence on a node B:
1) Receive R-APS(SF) from Node C and start FDB flush action at time E;
2) Receive R-APS(SF) from Node D and start FDB flush action at time F; and
3) FDB flush finish at time F'.

Therefore, the path switch time of the node B=time F'−time E.

Figure 9:
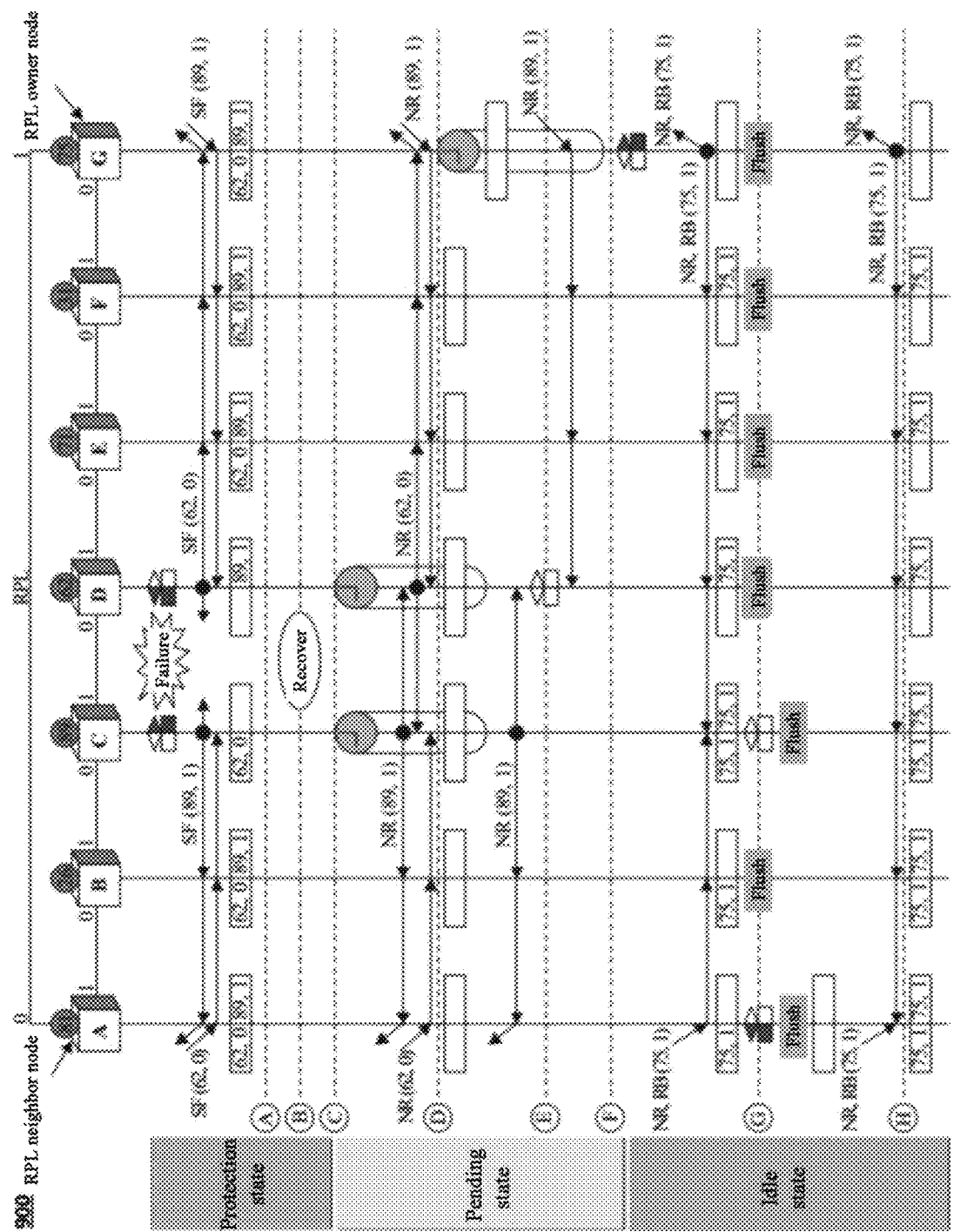
FIG. 9 illustrates another example diagram of measuring a path switch time according to an embodiment of the present disclosure.

FIG. 9 illustrates another example diagram 900 of measuring a path switch time according to an embodiment of the present disclosure. In the example, the following indications appear in sequence on the node B:
1) Receive R-APS(NR) from Node C, D at time D;
2) Receive R-APS(NR, RB) from Node G and start FDB flush action at time G; and
3) FDB flush finish at time G'.

Therefore, the path switch time of the node B=time G'−time D.

Figure 10:
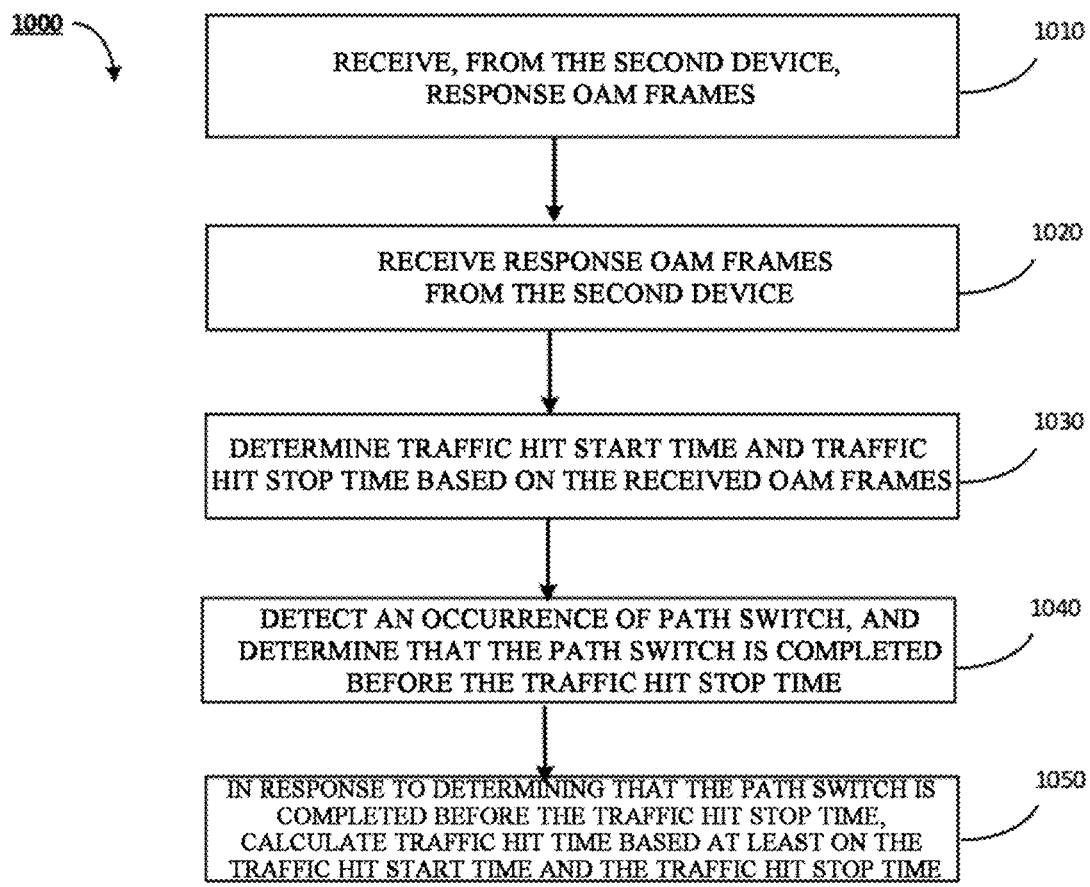
FIG. 10 illustrates a flowchart of an example method according to an embodiment of the present disclosure.

FIG. 10 illustrates a flowchart of an example method 1000 implemented at an SLM initiator according to an embodiment of the present disclosure.

The method 1000 may be implemented at the SLM initiator 501 as shown in FIG. 5 and the SLM initiator 701 as shown in FIG. 7. For purposes of discussion, the method 1000 will be described with reference to FIG. 7. It should be understood that, the method 1000 may include additional actions not shown in the figures and/or the illustrated actions may be omitted, and the scope of the present disclosure is not limited thereto.

In 1010, operation management maintenance (OAM) frames with continuous sequence numbers can be sent to the SLM responder 702.

In 1020, response OAM frames can be received from the SLM responder 702.

In 1030, traffic hit start time and traffic hit stop time can be determined based on the received OAM frames.

In 1040, an occurrence of the path switch can be detected, and it can be determined that the path switch is completed before the traffic hit stop time.

In 1050, in response to determining that the path switch is completed before the traffic hit stop time, traffic hit time can be calculated based at least on the traffic hit start time and the traffic hit stop time.

In some embodiments, receiving the response OAM frames from the SLM responder 702 may include: performing, by the SLM initiator 701, snapshots on sequence order values of the received OAM frames, wherein the sequence order values can correspond to the numbers of the OAM frames received at the SLM initiator 701 when the corresponding OAM frame is received at the SLM initiator 701.

In some embodiments, determining the traffic hit start time may include: based on the sequence numbers and the sequence order values of the received OAM frames, determining that M continuous OAM frames are lost, wherein M is a configurable positive integer, and the first frame among the M continuous OAM frames may correspond to the traffic hit start time.

In some embodiments, determining the traffic hit start time may include: based on the sequence numbers and the sequence order values of the received OAM frames, determining that Y OAM frames among X sent OAM frames are lost, wherein X and Y are configurable positive integers, and the first frame among the Y OAM frames may correspond to the traffic hit start time.

In some embodiments, determining the traffic hit stop time may include: based on the sequence numbers of the received OAM frames, determining that N continuous OAM frames are received, wherein N is a configurable positive integer, and the last frame among the N continuous OAM frames may correspond to the traffic hit stop time.

In some embodiments, the method 1000 may further include: after the traffic hit stop time is determined, saving a sequence number of a frame corresponding to the traffic hit start time and a sequence number of a frame corresponding to the traffic hit stop time.

In some embodiments, the OAM frame may have a constant period, and calculating the traffic hit time may include one of the following: calculating the number of lost frames based on the sequence number of the frame corresponding to the traffic hit start time and the sequence number of the frame corresponding to the traffic hit stop time, and calculating the traffic hit time based on the number of lost frames and the period of the OAM frame; or, calculating the traffic hit time based on the number of lost frames, the period of the OAM frame, and a maximum transmission unit (MTU) time of the OAM frame.

In some embodiments, the OAM frame may have a timestamp, and the method 1000 may further include: after the traffic hit stop time is determined, saving a timestamp of a frame corresponding to a traffic hit start time and a timestamp of the frame corresponding to the traffic hit stop time.

In some embodiments, determining the traffic hit time may include one of the following: calculating the traffic hit time based on the timestamp of the frame corresponding to the traffic hit stop time and the timestamp of the frame corresponding to the traffic hit start time; and calculating the traffic hit time based on the timestamp of the frame corresponding to the traffic hit stop time, the timestamp of the frame corresponding to the traffic hit start time, and the maximum transmission unit (MTU) time of the OAM frame.

In some embodiments, the SLM initiator 701 may detect the occurrence of the path switch by monitoring a state change of a protection group.

In some embodiments, the method 1000 may further include: storing the state of each OAM frame among the OAM frames in a memory as historical data, and employing an artificial intelligence/machine learning model to use the historical data to execute at least one of the following operations: predicting or determining when the path switch is triggered; and generating values of M, X, Y and N.

Figure 11:
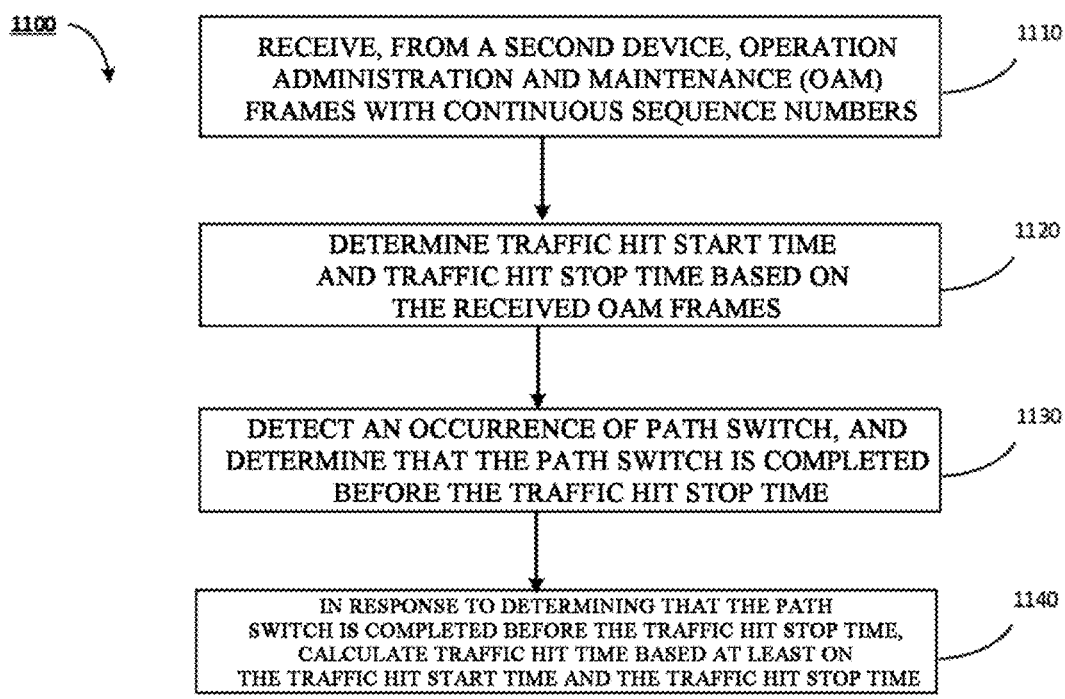
FIG. 11 illustrates a flowchart of another example method according to an embodiment of the present disclosure.

FIG. 11 illustrates a flowchart of an example method 1100 according to an embodiment of the present disclosure.

The method 1100 may be implemented at the SLM receiver (i.e., the SLM Rx_1 602 or SLM Rx_2 604) as shown in FIG. 6. For purposes of discussion, the method 1100 will be described with reference to FIG. 6. It should be understood that, the method 1100 may include additional actions not shown in the figures and/or the illustrated actions may be omitted, and the scope of the present disclosure is not limited thereto.

In 1110, operation management maintenance (OAM) frames with continuous sequence numbers can be received from the SLM sender.

In 1120, traffic hit start time and traffic hit stop time can be determined based on the received OAM frames.

In 1130, an occurrence of the path switch can be detected, and it can be determined that the path switch is completed before the traffic hit stop time.

In 1140, in response to determining that the path switch is completed before the traffic hit stop time, traffic hit time can be calculated based at least on the traffic hit start time and the traffic hit stop time.

In some embodiments, receiving the OAM frames from the SLM sender may include: performing, by the SLM receiver, snapshots on sequence order values of the received OAM frames, wherein the sequence order values may correspond to the numbers of the OAM frames received at the SLM receiver when the corresponding OAM frame is received at the SLM receiver.

In some embodiments, determining the traffic hit start time may include: based on the sequence numbers and the sequence order values of the received OAM frames, determining that M continuous OAM frames are lost, wherein M is a configurable positive integer, and the first frame among the M continuous OAM frames may correspond to the traffic hit start time.

In some embodiments, determining the traffic hit start time may include: based on the sequence numbers and the sequence order values of the received OAM frames, determining that Y OAM frames among X sent OAM frames are lost, wherein X and Y are configurable positive integers, and the first frame among the Y OAM frames may correspond to the traffic hit start time.

In some embodiments, determining the traffic hit stop time may include: based on the sequence numbers of the received OAM frames, determining that N continuous OAM frames are received, wherein N is a configurable positive integer, and the last frame among the N continuous OAM frames may correspond to the traffic hit stop time.

In some embodiments, the method 1100 further may include: after the traffic hit stop time is determined, saving a sequence number of a frame corresponding to the traffic hit start time and a sequence number of a frame corresponding to the traffic hit stop time.

In some embodiments, the OAM frame may have a constant period, and calculating the traffic hit time may include one of the following: calculating the number of lost frames based on the sequence number of the frame corresponding to the traffic hit start time and the sequence number of the frame corresponding to the traffic hit stop time, and calculating the traffic hit time based on the number of lost frames and the period of the OAM frame; or, calculating the traffic hit time based on the number of lost frames, the period of the OAM frame, and a maximum transmission unit (MTU) time of the OAM frame.

In some embodiments, the OAM frame may have a timestamp, and the method 1100 may further include: after the traffic hit stop time is determined, saving a timestamp of a frame corresponding to the traffic hit start time and a timestamp of a frame corresponding to the traffic hit stop time.

In some embodiments, determining the traffic hit time may include one of the following: calculating the traffic hit time based on the timestamp of the frame corresponding to the traffic hit stop time and the timestamp of the frame corresponding to the traffic hit start time; and calculating the traffic hit time based on the timestamp of the frame corresponding to the traffic hit stop time, the timestamp of the frame corresponding to the traffic hit start time, and the maximum transmission unit (MTU) time of the OAM frame.

In some embodiments, the SLM receiver may detect the occurrence of the path switch by monitoring a state change of a protection group.

In some embodiments, the method 1100 may further includes: storing the state of each OAM frame among the OAM frames in a memory as historical data, and employing an artificial intelligence/machine learning model to use the historical data to execute at least one of the following operations: predicting or determining when the path switch is triggered; and generating values of M, X, Y and N.

Figure 12:
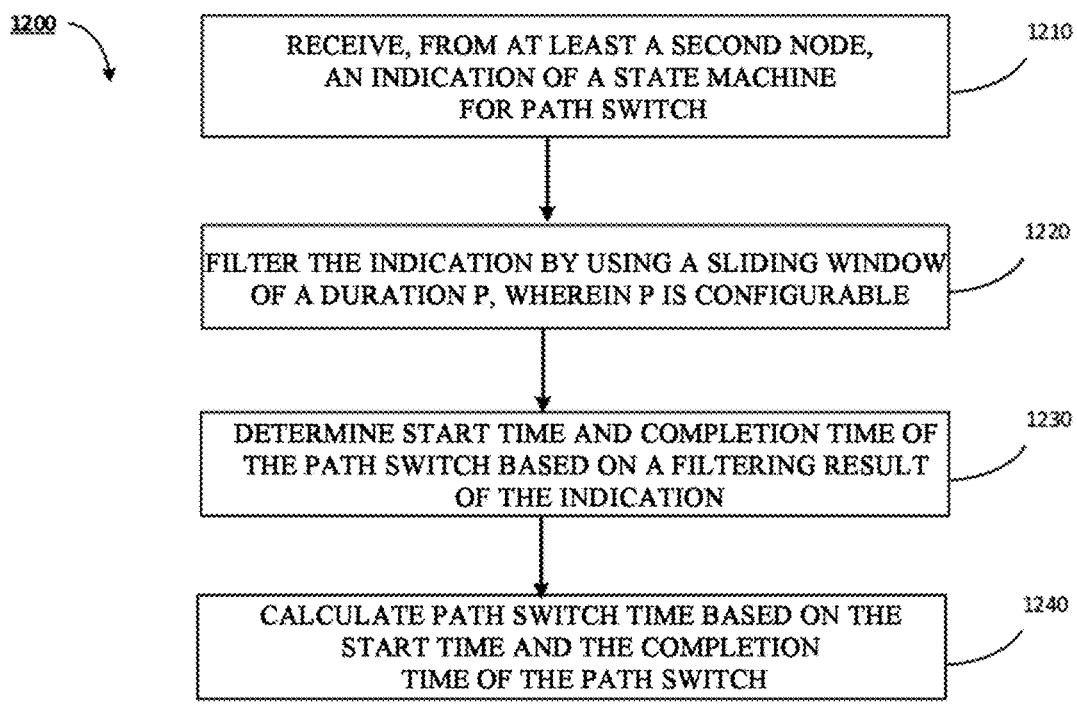
FIG. 12 illustrates a flowchart of another example method according to an embodiment of the present disclosure.

FIG. 12 illustrates a flowchart of an example method 1200 according to an embodiment of the present disclosure.

The method 1200 may be implemented at the node B as shown in FIG. 8. For purposes of discussion, the method 1200 will be described with reference to FIG. 8. It should be understood that, the method 1200 may include additional actions not shown in the figures and/or the illustrated actions may be omitted, and the scope of the present disclosure is not limited thereto.

In 1210, an indication of a state machine for path switch can be received from the node C and/or the node D.

In 1220, the indication can be filtered by using a sliding window of a duration P, wherein P is configurable.

In 1230, start time and completion time of the path switch can be determined based on a filtering result of the indication.

In 1240, path switch time can be calculated based on the start time and the completion time of the path switch.

In some embodiments, the indication may include at least one of the following: a change of a protection state; a condition for triggering the change of the protection state; a condition for triggering a filtering database (FDB) flushing action; start/completion of network bridge setup; start/completion of selector setup; start/completion of the FDB flushing action; and blocking/unblocking of a ring network port.

In some embodiments, determining the start time of the path switch may include: if one indication among the indications is filtered, and no indication of the state machine occurs within the duration P before the one indication filtered, determining a timestamp of a frame corresponding to the one indication to be the start time of the path switch.

In some embodiments, determining the completion time of the path switch may include: if no indication of the state machine occurs within the duration P after the last filtered indication among the indications, determining a timestamp of a frame corresponding to the last filtered indication to be the completion time of the path switch.

In some embodiments, the path switch may be based on at least one of the following mechanisms: Ethernet linear protection; Ethernet ring network protection; and/or spanning tree protocol.

Compared with the traditional offline test method, the OAM-based measurement method and snooping measurement method provided in the embodiments of the present disclosure have various significant advantages as shown in the following table.

| | Traditional method | Proposed OAM-based method | Proposed snooping method |
| --- | --- | --- | --- |
| Solution | Test Pattern is generated by external test instrument. | Use ETH-OAM protocol frames embedded in the user data flow. | Snoop Eth Protect Protocol frames and adding timestamps when the state changes. |
| Impact on the user traffic | Out of service | In service | In service |
| Accuracy of the traffic hit time | No accuracy as it does not measure the real traffic. | Sufficient accuracy of milliseconds | Sufficient accuracy of milliseconds |
| Traffic hit time | Covers the entire protected traffic restoration time as per ITU-T G.808.1. | Covers the entire protected traffic restoration time as per ITU-T G.808.1. | Covers only the partial restoration time (i.e. T4 or T3 + T4 as per ITU-T G.808.1). |
| Traffic hit time in the case of multiple switching operations | The total traffic hit time experienced during all switching operations. | The traffic hit time for each time switching operation. | The switching time for each time switching operation. |
| Granularity of the monitored traffic | Per user traffic | Per user traffic | Per Ethernet protection group (protecting multiple user traffics.) |
| Applicable network type | Ethernet services over any carrier networks (native Ethernet networks, Ethernet over MPLS(-TP) networks, Ethernet or IP networks, etc). | Ethernet services over any carrier networks (native Ethernet networks, Ethernet over MPLS(-TP) networks, Ethernet or IP networks, etc). | Native Ethernet networks. |

Generally, various embodiments of the present disclosure may be implemented in hardware or dedicated circuits, software, logic, or any combinations thereof. Some aspects may be implemented in hardware, while other aspects may be implemented in firmware or software, which may be executed by a controller, a microprocessor, or other computing devices. Although various aspects of embodiments of the present disclosure are shown and described as block diagrams, flowcharts, or using some other illustrations, it should be understood that the blocks, apparatuses, systems, techniques or methods described herein may be implemented as, for example, nonrestrictive examples, hardware, software, firmware, dedicated circuits or logic, general-purpose hardware or controllers, or other computing devices, or some combinations thereof.

The present disclosure further provides at least one computer program product, which is tangibly stored on a non-transitory computer-readable storage medium. The computer program product includes computer-executable instructions, such as instructions included in program modules, and the computer-executable instructions are executed in a device on a real or virtual processor of a target, so as to execute the methods as described above with reference to FIGS. 10-12. Generally, the program modules include routines, programs, libraries, objects, categories, components, data structures, and the like for executing particular tasks or implementing particular abstract data types. In various embodiments, the functions of the program modules may be combined or segmented between the program modules as needed. Machine-executable instructions for the program modules may be executed inside local or distributed devices. In the distributed devices, the program modules may be located in local and remote storage media.

Computer program codes for implementing the methods of the present disclosure may be compiled in one or more programming languages. These computer program codes may be provided for processors of general-purpose computers, special-purpose computers, or other programmable data processing apparatuses, such that the program codes, when executed by the computers or other programmable data processing apparatuses, cause specified functions/operations in the flowcharts and/or block diagrams to be implemented. The program codes may be entirely executed on the computers, partly on the computers, as stand-alone software packages, partly on the computers and partly on remote computers or entirely on the remote computers or servers.

In the context of the present disclosure, the computer program codes or related data may be carried by any suitable carriers, so that the devices, apparatuses or processors may execute the various processing and operations described above. Examples of the carriers include signals, computer-readable media, and the like. Examples of the signals may include electrical, optical, radio, sound, or other forms of propagation signals, such as carriers, infrared signals, and the like.

The computer-readable medium may be any tangible medium, which includes or stores programs for or about instruction execution systems, apparatuses or devices. The computer-readable medium may be a computer-readable signal medium or a computer-readable storage medium. The computer-readable medium may include, but is not limited to, electronic, magnetic, optical, electromagnetic, infrared or semiconductor systems, apparatuses or devices, or any suitable combinations thereof. More detailed examples of the computer-readable storage medium include: an electrical connection with one or more wires, a portable computer disk, a hard disk, a random access memory (RAM), a read-only memory (ROM), an erasable programmable read-only memory (EPROM or flash memory), an optical storage device, a magnetic storage device, or any suitable combinations thereof.

In addition, although the operations of the methods of the present disclosure are described in a particular order in the drawings, this does not require or imply that these operations must be executed in the particular order, or that all of the illustrated operations must be executed to achieve the desired results. Rather, the execution order of the steps depicted in the flowcharts may be changed. Additionally or alternatively, certain steps may be omitted, a plurality of steps may be combined into one step for execution, and/or one step may be decomposed into a plurality of steps for execution. It should also be noted that, the features and functions of two or more apparatuses according to the present disclosure may be embodied in one apparatus. Conversely, the features and functions of one apparatus described above may be further divided into a plurality of apparatuses to be embodied.

Although the present disclosure has been described with reference to several specific embodiments, it should be understood that the present disclosure is not limited to the specific embodiments disclosed. The present disclosure is intended to cover various modifications and equivalent arrangements included within the spirit and scope of the appended claims.

We claim:

1. A method for measuring traffic hit time during path switch, wherein the method is performed at a first device, and comprises:
    sending, to a second device, operation administration and maintenance (OAM) frames with continuous sequence numbers;
    receiving, from the second device, response OAM frames;
    determining traffic hit start time and traffic hit stop time based on the received OAM frames;
    detecting an occurrence of the path switch, and determining that the path switch is completed before the traffic hit stop time; and
    in response to determining that the path switch is completed before the traffic hit stop time, calculating the traffic hit time based at least on the traffic hit start time and the traffic hit stop time.

2. The method according to claim 1, wherein receiving from the second device the response OAM frames comprises:
    performing, by the first device, snapshots on sequence order values of the received OAM frames, wherein the sequence order values correspond to the numbers of the OAM frames that have been received at the first device when the corresponding OAM frame is received at the first device.

3. The method according to claim 2, wherein determining the traffic hit start time comprises:
    based on the sequence numbers and the sequence order values of the received OAM frames, determining that Y OAM frames among X sent OAM frames are lost, wherein X and Y are configurable positive integers, and the traffic hit start time corresponds to the first frame among the Y OAM frames.

4. The method according to claim 2, wherein determining the traffic hit start time comprises:
    based on the sequence numbers and the sequence order values of the received OAM frames, determining that M continuous OAM frames are lost, wherein M is a configurable positive integer, and the traffic hit start time corresponds to the first frame among the M continuous OAM frames.

5. The method according to claim 4, wherein determining the traffic hit stop time comprises:
    based on the sequence numbers of the received OAM frames, determining that N continuous OAM frames are received, wherein N is a configurable positive integer, and the traffic hit stop time corresponds to the first frame among the N continuous OAM frames.

6. The method according to claim 5, further comprising:
    after the traffic hit stop time is determined, saving a sequence number of a frame corresponding to the traffic hit start time and a sequence number of a frame corresponding to the traffic hit stop time.

7. The method according to claim 6, wherein the OAM frame has a constant period, and calculating the traffic hit time comprises one of the following:

calculating the number of lost frames based on the sequence number of the frame corresponding to the traffic hit start time and the sequence number of the frame corresponding to the traffic hit stop time, and calculating the traffic hit time based on the number of lost frames and the period of the OAM frame; or calculating the traffic hit time based on the number of lost frames, the period of the OAM frame, and a maximum transmission unit (MTU) time of the OAM frame.

8. The method according to claim 5, wherein the OAM frame has a timestamp, and the method further comprises:
after the traffic hit stop time is determined, saving a timestamp of a frame corresponding to the traffic hit start time and a timestamp of the frame corresponding to a traffic hit stop time.

9. The method according to claim 8, wherein determining the traffic hit time comprises one of the following:
calculating the traffic hit time based on the timestamp of the frame corresponding to the traffic hit stop time and the timestamp of the frame corresponding to the traffic hit start time; or calculating the traffic hit time based on the timestamp of the frame corresponding to the traffic hit stop time, the timestamp of the frame corresponding to the traffic hit start time, and the maximum transmission unit (MTU) time of the OAM frame.

10. The method according to claim 5, further comprising:
storing a state of OAM frame among the OAM frames in a memory as historical data, and employing an artificial intelligence/machine learning model to use the historical data to perform at least one of the following:
predicting or determining when the path switch is triggered; and
generating values of M, X, Y and N.

11. The method according to claim 1, wherein the first device detects the occurrence of the path switch by monitoring a state change of a protection group.

12. A method for measuring traffic hit time during path switch, wherein the method is performed at a first device, and comprises:
receiving, from a second device, operation administration and maintenance (OAM) frames with continuous sequence numbers;
determining traffic hit start time and traffic hit stop time based on the received OAM frames;
detecting an occurrence of the path switch, and determining that the path switch is completed before the traffic hit stop time; and
in response to determining that the path switch is completed before the traffic hit stop time, calculating traffic hit time based at least on the traffic hit start time and the traffic hit stop time.

13. The method according to claim 12, wherein receiving from the second device the OAM frames comprises:
performing, by the first device, snapshots on sequence order values of the received OAM frames, wherein the sequence order values correspond to the numbers of the OAM frames that have been received at the first device when the corresponding OAM frame is received at the first device.

14. The method according to claim 13, wherein determining the traffic hit start time comprises:
based on the sequence numbers and the sequence order values of the received OAM frames, determining that Y OAM frames among X sent OAM frames are lost, wherein X and Y are configurable positive integers, and the traffic hit start time corresponds to the first frame among the Y OAM frames.

15. The method according to claim 13, wherein determining the traffic hit start time comprises:
based on the sequence numbers and the sequence order values of the received OAM frames, determining that M continuous OAM frames are lost, wherein M is a configurable positive integer, and the traffic hit start time corresponds to the first frame among the M continuous OAM frames.

16. The method according to claim 15, wherein determining the traffic hit stop time comprises:
based on the sequence numbers of the received OAM frames, determining that N continuous OAM frames are received, wherein N is a configurable positive integer, and the traffic hit stop time corresponds to the first frame among the N continuous OAM frames.

17. The method according to claim 16, further comprising:
after the traffic hit stop time is determined, saving a sequence number of a frame corresponding to the traffic hit start time and a sequence number of a frame corresponding to the traffic hit stop time.

18. The method according to claim 17, wherein the OAM frame has a constant period, and calculating the traffic hit time comprises one of the following:
calculating the number of lost frames based on the sequence number of the frame corresponding to the traffic hit start time and the sequence number of the frame corresponding to the traffic hit stop time, and calculating the traffic hit time based on the number of lost frames and the period of the OAM frame; or calculating the traffic hit time based on the number of lost frames, the period of the OAM frame, and a maximum transmission unit (MTU) time of the OAM frame.

19. The method according to claim 16, wherein the OAM frame has a timestamp, and the method further comprises:
after the traffic hit stop time is determined, saving a timestamp of a frame corresponding to the traffic hit start time and a timestamp of the frame corresponding to a traffic hit stop time.

20. The method according to claim 19, wherein determining the traffic hit time comprises one of the following:
calculating the traffic hit time based on the timestamp of the frame corresponding to the traffic hit stop time and the timestamp of the frame corresponding to the traffic hit start time; and calculating the traffic hit time based on the timestamp of the frame corresponding to the traffic hit stop time, the timestamp of the frame corresponding to the traffic hit start time, and the maximum transmission unit (MTU) time of the OAM frame.

21. The method according to claim 12, wherein the first device detects the occurrence of the path switch by monitoring a state change of a protection group.

22. The method according to claim 16, further comprising:
storing a state of OAM frame among the OAM frames in a memory as historical data, and employing an artificial intelligence/machine learning model to use the historical data to perform at least one of the following:
predicting or determining when the path switch is triggered; and
generating values of M, X, Y and N.

23. A first device for measuring traffic hit time during path switch, comprising:
   at least one processor; and
   at least one memory including computer program code, wherein
   the at least one memory and the computer program code are configured to, with the at least one processor, cause the first device to:
   receive, from a second device, operation administration and maintenance (OAM) frames with continuous sequence numbers;
   determine traffic hit start time and traffic hit stop time based on the received OAM frames;
   detect an occurrence of the path switch, and determine that the path switch is completed before the traffic hit stop time; and
   in response to determining that the path switch is completed before the traffic hit stop time, calculate traffic hit time at least based on the traffic hit start time and the traffic hit stop time.

* * * * *